(12) United States Patent
Onuma et al.

(10) Patent No.: US 8,597,854 B2
(45) Date of Patent: Dec. 3, 2013

(54) POLYMER ELECTROLYTE MEMBRANE, AND MEMBRANE ELECTRODE ASSEMBLY AND POLYMER ELECTROLYTE FUEL CELL USING THE SAME

(75) Inventors: Atsuhiko Onuma, Hitachi (JP); Jun Kawaji, Hitachinaka (JP); Shuichi Suzuki, Hitachinaka (JP); Yoshiyuki Takamori, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 220 days.

(21) Appl. No.: 13/286,253

(22) Filed: Nov. 1, 2011

(65) Prior Publication Data

US 2012/0107721 A1 May 3, 2012

(30) Foreign Application Priority Data

Nov. 2, 2010 (JP) ................. 2010-245873

(51) Int. Cl.
*H01M 8/10* (2006.01)
(52) U.S. Cl.
USPC ............ 429/492; 429/491; 429/482; 429/483
(58) Field of Classification Search
None
See application file for complete search history.

(56) References Cited

U.S. PATENT DOCUMENTS

| | | | |
|---|---|---|---|
| 2007/0031716 A1* | 2/2007 | Rajendran | 429/33 |
| 2010/0291462 A1* | 11/2010 | Thate et al. | 429/483 |

FOREIGN PATENT DOCUMENTS

| | | | |
|---|---|---|---|
| JP | 58-18880 | 2/1983 | |
| JP | 1-52866 | 11/1989 | |
| JP | 2002-110174 | 4/2002 | |
| JP | 2002-164057 | 6/2002 | |
| JP | 2003-31232 | 1/2003 | |
| JP | 2005-216701 | 8/2005 | |
| JP | 2005-317287 | 11/2005 | |
| JP | 2005-353408 | 12/2005 | |
| JP | 2006-512428 | 4/2006 | |
| JP | 2007-134306 | 5/2007 | |
| JP | 2010-113876 | 5/2010 | |
| WO | WO 2004/042839 A2 | 5/2004 | |
| WO | WO 2007/020258 * | 2/2007 | ............ B01D 69/12 |

* cited by examiner

*Primary Examiner* — Cynthia K. Walls
(74) *Attorney, Agent, or Firm* — Antonelli, Terry, Stout & Kraus, LLP.

(57) ABSTRACT

Disclosed is a fuel cell in which a membrane electrode assembly less undergoes increase in ion conduction resistance, and a polymer electrolyte membrane less undergoes deterioration. Specifically, the polymer electrolyte membrane includes a first membrane and a second membrane being two different membranes composed of polymer electrolytes having different ion-exchange capacities, in which the first membrane has an area of one surface thereof equal to or larger than an area of one surface of an anode or a cathode, and the second membrane has an area of one surface thereof smaller than that of the first membrane and is arranged in a gas inflow region on a side being in contact with the cathode. The second membrane has an ion-exchange capacity smaller than that of the first membrane or has a number-average molecular weight larger than that of the first membrane.

11 Claims, 8 Drawing Sheets

POLYMER ELECTROLYTE MEMBRANE, AND MEMBRANE ELECTRODE ASSEMBLY AND POLYMER ELECTROLYTE FUEL CELL USING THE SAME

CLAIM OF PRIORITY

The present application claims priority from Japanese Patent application serial No. 2010-245873, filed on Nov. 2, 2010, the content of which is hereby incorporated by reference into this application.

BACKGROUND OF THE INVENTION

1. Field of the Invention

The present invention relates to a polymer electrolyte membrane, and a membrane electrode assembly and a polymer electrolyte fuel cell using the polymer electrolyte membrane.

2. Description of Related Art

Fluorocarbon polymer electrolyte membranes having a high proton conductivity such as Nafion (registered trademark, supplied by Dupont), Aciplex (registered trademark, supplied by Asahi Kasei Chemicals Corporation), or Flemion (registered trademark, supplied by Asahi Glass Co., Ltd.) are known as polymer electrolyte membranes of fuel cells. However such fluorocarbon electrolyte membranes are very expensive and form hydrofluoric acid when they are burnt upon discarding.

In addition, the fluorocarbon electrolyte membranes are not usable at high temperatures of 100° C. or higher because of reduction in ionic conductivity. When used as electrolyte membranes in direct methanol fuel cells (hereinafter also referred to as DMFCs), they suffer from problems such as reduction in voltage and reduction in electric efficiency due to methanol crossover.

To solve these problems, Japanese Unexamined Patent Application Publication No. 2003-31232 and Japanese Unexamined Patent Application Publication (Translation of PCT Application) No. 2006-512428 disclose hydrocarbon polymer electrolyte membranes composed typically of inexpensive poly (ether sulfone) or poly (ether ketone) polymers as polymer electrolyte membranes for use in polymer electrolyte fuel cells and direct methanol fuel cells. These are proposed as alternatives for fluorocarbon electrolyte membranes.

In fuel cells, there occurs a phenomenon in which a peroxide is formed in an electrode catalyst layer as a result of an electrode reaction, the peroxide diffuses and becomes a free radical, and the resulting peroxide free radical erodes and deteriorates the electrolyte. The generation of the peroxide free radical is promoted particularly by metal ions (e.g., $Fe^{2+}$ and $Cu^{2+}$) dissolved out from a charging line of mist which is to be mixed with a feed fuel (gas or liquid) so as to keep the feed fuel or electrolyte wet. For these reasons, the polymer electrolyte membranes composed of poly(ether sulfone) block copolymers or poly(ether ketone) block copolymers which do not having so satisfactory oxidation resistance are oxidized, decomposed and deteriorated by the peroxide free radical, resulting in short lives.

Japanese Unexamined Patent Application Publication No. 2005-216701 and Japanese Unexamined Patent Application Publication No. 2005-353408 disclose techniques of forming a layer which contains a metal oxide serving as a peroxide-decomposing catalyst between an electrode catalyst layer and an electrolyte layer in order to reduce the deterioration of the electrolyte membrane.

Japanese Unexamined Patent Application Publication No. 2002-110174 discloses a polymer electrolyte composed of an aromatic hydrocarbon polymer compound including a sulfoalkyl group in its side chain.

Japanese Unexamined Patent Application Publication No. 2007-134306 discloses a membrane electrode assembly for a direct oxidation fuel cell which includes an anode and a cathode each provided with a catalyst layer containing a solid proton-conductive material and a catalyst, in which the proton-conductive material contained in the anode catalyst layer has an equivalent weight (EW) larger than the equivalent weight (EW) of the proton-conductive material contained in the cathode catalyst layer.

Japanese Unexamined Patent Application Publication No. 2002-164057 discloses a polymer electrolyte fuel cell which includes a polymer electrolyte membrane and two catalyst layers provided on both principal surfaces of the polymer electrolyte membrane, in which the catalyst layers each include a catalyst powder and at least two different ion-exchange resins having different EWs, and the EWs of the ion-exchange resins in the catalyst layers vary along the thickness direction and plane direction of the catalyst layer.

Japanese Unexamined Patent Application Publication No. 2005-317287 discloses a membrane electrode assembly which includes electrodes each having a catalyst layer; and an electrolyte containing a proton-conductive resin, in which the catalyst layer is immersed with the electrolyte, and the proton-conductive resin in the electrolyte has an EW gradually increasing from the upstream side toward the downstream side of gas passages in contact with the electrodes.

Japanese Examined Patent Application Publication No. H01-52866 discloses a fuel cell having satisfactory ionic conductivity, which is composed of a hydrophilic membrane having sulfone groups in an amount in terms of exchange capacity of 0.1 to 3 milliequivalents per gram, having an electric resistance of 0.05 to 2 $\Omega \cdot cm^2$ in a diluted sulfuric acid, and having a methanol permeability coefficient of $5 \times 10^{-3}$ cm/min or less. This patent literature also describes a method for measuring an exchange capacity.

SUMMARY OF THE INVENTION

The present invention provides a polymer electrolyte membrane for use in a membrane electrode assembly including an anode, a cathode and the polymer electrolyte membrane, the polymer electrolyte membrane comprising a first membrane and a second membrane being two different membranes composed of polymer electrolytes having different ion-exchange capacities from each other, wherein the first membrane has an area of one surface thereof equal to or larger than an area of one surface of the anode or cathode, and wherein the second membrane has an area of one surface thereof smaller than that of the first membrane, is arranged in a gas inflow region on a side being is in contact with the cathode, and has an ion-exchange capacity smaller than that of the first membrane or has a number-average molecular weight larger than that of the first membrane.

The present invention can provide a polymer electrolyte membrane being inexpensive and having satisfactory mechanical properties and excellent oxidation resistance and provides a membrane electrode assembly and a fuel cell each using the polymer electrolyte membrane. Thus, the present invention can provide a fuel cell which has a high output (power) and a high durability (long life).

DETAILED DESCRIPTION OF THE PREFERRED EMBODIMENTS

The present invention relates to fuel cells, and more specifically relates to polymer electrolyte fuel cells and direct methanol fuel cells.

The known techniques (particularly those disclosed in Japanese Unexamined Patent Application Publication No. 2005-216701 and Japanese Unexamined Patent Application Publication No. 2005-353408) are susceptible to improvements because the membrane electrode assemblies do not so significantly exhibit effects of allowing membrane electrode assemblies to have longer lives, and have large ion conduction resistance due to the addition of additives such as metal oxides.

Accordingly, an object of the present invention is to suppress the increase in ion conduction resistance in a membrane electrode assembly and to suppress the deterioration of a polymer electrolyte membrane, both in a fuel cell.

We made intensive investigations in order to find a polymer electrolyte fuel cell which excels in long-term durability in a continuous power generation test for a direct methanol fuel cell.

We performed a long-term continuous power generation test of a direct methanol fuel cell which is provided with a polymer electrolyte membrane electrode assembly including a polymer electrolyte membrane composed of an electrolyte of a single type, and electrode catalyst layers arranged on both sides of the polymer electrolyte membrane. As a result, we found that this direct methanol fuel cell became incapable of generating electricity due to the deterioration of the electrolyte membrane. We also have found that deteriorated portions of the electrolyte membrane are a first region (gas inflow region) and a second region (gas outflow region), in which the first region corresponds to the vicinity of a cathode-side oxidative gas inlet, and the second region corresponds to the vicinity of a cathode-side oxidative gas outlet, each in an assembled single cell of the fuel cell.

The deterioration of electrolyte membrane is probably caused by peroxides such as hydrogen peroxide generated during a reaction process in the fuel cell.

We have made further investigations while considering that an electrolyte membrane less suffers from deterioration to thereby allow a direct methanol fuel cell to have a longer life by the suppression of the deterioration of the first region corresponding to the vicinity of the cathode-side oxidative gas inlet and the deterioration of the second region corresponding to the vicinity of the cathode-side oxidative gas outlet in an assembled single cell of fuel cell. The present invention has been made based on these findings and investigations.

A polymer electrolyte fuel cell according to an embodiment of the present invention has the following characteristics.

Specifically, the polymer electrolyte fuel cell is a polymer electrolyte fuel cell which includes a polymer electrolyte membrane electrode assembly; and gas diffusion layers provided on both sides of the polymer electrolyte membrane electrode assembly, in which the polymer electrolyte membrane electrode assembly is an assembly of a polymer electrolyte membrane composed of an electrolyte, and electrode catalyst layers provided on and integrated with both sides of the polymer electrolyte membrane, and the gas diffusion layers are arranged so as to be in contact with the electrode catalyst layers, respectively.

Of the electrolyte membrane, the first region, corresponding to the vicinity of the cathode-side oxidative gas inlet in an assembled single cell of fuel cell has an ion-exchange capacity relatively smaller than that of another region of the electrolyte membrane.

The first region may have an electrolyte layer on a surface of the electrolyte membrane facing the cathode catalyst layer, which electrolyte layer has an ion-exchange capacity relatively smaller than that of an electrolyte of the other region.

The first region may have a number-average molecular weight relatively larger than that of the other region of the electrolyte membrane.

In an embodiment, the first region has an electrolyte layer on a surface of the electrolyte membrane facing the cathode catalyst layer, which electrolyte layer has a number-average molecular weight relatively larger than that of the electrolyte of the other region.

In another embodiment of the membrane electrode assembly, an electrolyte present in the first region has a peroxide-decomposing catalyst.

In yet another embodiment of the membrane electrode assembly, an electrode catalyst layer being in contact with the first region has a peroxide-decomposing catalyst.

The membrane electrode assembly includes a second region of the electrolyte membrane corresponding to the vicinity of the cathode-side oxidative gas outlet in an assembled single cell of fuel cell has an ion-exchange capacity relatively smaller than that of another region of the electrolyte membrane.

In the membrane electrode assembly, the second region may have an electrolyte layer on a surface of the electrolyte membrane facing the cathode catalyst layer, the electrolyte layer having an ion-exchange capacity relatively smaller than that of an electrolyte of the other region.

In an embodiment of the membrane electrode assembly, the second region has a number-average molecular weight relatively larger than that of the other region of the electrolyte membrane.

In another embodiment of the membrane electrode assembly, an electrolyte present in the second region has a peroxide-decomposing catalyst.

In yet another embodiment of the membrane electrode assembly, the second region includes an electrolyte layer on a surface of the electrolyte membrane facing the cathode catalyst layer, the electrolyte layer having a number-average molecular weight relatively larger than that of the electrolyte of the other region.

In still another embodiment of the membrane electrode assembly, an electrode catalyst layer being in contact with the second region has a peroxide-decomposing catalyst.

The electrolytes preferably have ion-exchange capacities of 0.3 to 5.0 meq/g (0.3 meq/g or more and 5.0 meq/g or less).

Characteristics of polymer electrolyte membranes according to embodiments of the present invention, and of a membrane electrode assembly and a polymer electrolyte fuel cell using the same will be collectively described below.

The polymer electrolyte membrane according to one embodiment is for use in a membrane electrode assembly including an anode, a cathode and the polymer electrolyte membrane interposed between the anode and the cathode and includes a first membrane and a second membrane which are two different membranes composed of polymer electrolytes having different ion-exchange capacities. The first membrane has an area of one surface thereof equal to or larger than the area of one surface of the anode or cathode. The second membrane has an area of one surface thereof smaller than that of the first membrane, is arranged in a gas inflow region on a side being in contact with the cathode, and has an ion-exchange capacity smaller than that of the first membrane.

The polymer electrolyte membrane according to another embodiment is for use in a membrane electrode assembly including an anode, a cathode and the polymer electrolyte membrane interposed between the anode and the cathode and includes a first membrane and a second membrane which are two different membranes composed of polymer electrolytes having different ion-exchange capacities from each other. The first membrane has an area of one surface thereof equal to or larger than the area of one surface of the anode or the cathode. The second membrane has an area of one surface thereof smaller than that of the first membrane, is arranged in a gas inflow region on a side being in contact with the cathode, and has a number-average molecular weight larger than that of the first membrane.

In the polymer electrolyte membrane, the second membrane may contain a peroxide-decomposing catalyst.

In an embodiment, the polymer electrolyte membrane further includes another ply of the second membrane arranged in a gas outflow region on a side being in contact with the cathode.

In another embodiment of the polymer electrolyte membrane, the one surface of the first membrane is rectangular, and the two plies of the second membrane are arranged on opposite corners of the rectangular one surface.

Polymer electrolytes constituting the polymer electrolyte membrane may be aromatic hydrocarbon electrolytes.

The membrane electrode assembly structurally includes an anode, a cathode and the polymer electrolyte membrane, in which the polymer electrolyte membrane is interposed between the anode and the cathode.

In an embodiment of the membrane electrode assembly, at least the cathode being in contact with the second membrane contains a peroxide-decomposing catalyst.

The polymer electrolyte fuel cell includes the membrane electrode assembly.

Some embodiments of the direct methanol fuel cell according to the present invention will be illustrated in detail below.

A direct methanol fuel cell according to an embodiment of the present invention is fundamentally a polymer electrolyte fuel cell which includes a polymer electrolyte membrane electrode assembly composed of a polymer electrolyte membrane and electrode catalyst layers which are laminated to be integrated; and gas diffusion layers provided on both sides of the polymer electrolyte membrane electrode assembly so as to be in contact with the electrode catalyst layers, the electrode catalyst layers being provided on both sides of the polymer electrolyte membrane.

As used herein the term "ion-exchange capacity" refers to the number of ion-exchange groups per unit weight of the polymer. With an increasing ion-exchange capacity, the degree of introduction of ion-exchange groups increases. The ion-exchange capacity may be measured typically through $^1$H-NMR spectroscopy, elemental analysis, acid-base titration described in Japanese Examined Patent Application Publication No. H01-52866, or non-aqueous acid-base titration (using a solution of potassium methoxide in benzene and methanol as a standard solution).

In the direct methanol fuel cell according to the present invention, the electrolyte membrane preferably has an ion-exchange capacity of 0.3 to 5.0 meq/g. If the electrolyte membrane has an ion-exchange capacity of less than 0.3 meq/g, it may show an excessively high resistance during the power generation of the fuel cell, resulting in a reduced output. In contrast, if the electrolyte membrane has an ion-exchange capacity of more than 5.0 meq/g, it may show increased methanol permeability and/or decreased mechanical properties. Thus they are both undesirable. For giving an electrolyte membrane having satisfactory mechanical properties and for allowing the resulting polymer electrolyte fuel cell to have a higher output, the electrolyte membrane therefore preferably has an ion-exchange capacity of 0.3 meq/g or more and 5.0 meq/g or less.

Exemplary polymer materials for use in the polymer electrolyte fuel cell according to the present invention include perfluoroalkylsulfonic acid electrolytes, sulfonated engineering plastic electrolytes, hydrocarbon electrolytes and engineering plastic polymers. Each of these may have one or more substituents.

Exemplary sulfonated engineering plastic electrolytes include sulfonated polyketones, sulfonated polysulfones and sulfonated polyphenylenes.

Exemplary hydrocarbon electrolytes include sulfoalkylated polyketones, sulfoalkylated polysulfones, sulfoalkylated polyphenylenes and sulfoalkylated engineering plastic electrolytes.

Exemplary engineering plastic polymers include poly (ether ketone) copolymers, poly(ether ether ketone) copolymers, poly(ether sulfone) copolymers, polyimide copolymers, polybenzimidazole copolymers and polyquinoline copolymers.

A material for constituting the layer having a peroxide-decomposing catalyst for use herein is not limited, as long as one having a catalytic activity of decomposing a peroxide. Examples of such materials include metals, metal oxides, metal phosphates, metal fluorides, macrocyclic metal complexes and carbons. Each of these may be used alone or in combination. Among them, preferred metals include Ni, Ce, Co and Cr; preferred metal oxides include $NiO_2$, $PbO_2$, $PdO_2$, $RuO$, $WO_3$, $CeO_2$ and $Fe_3O_4$; preferred metal phosphates include $CePO_4$, $CrPO_4$, $AlPO_4$ and $FePO_4$; preferred metal fluorides include $CeF_3$ and $FeF_3$; and preferred macrocyclic metal complexes include Fe-porphyrin, Co-porphyrin, heme and catalase.

The carbons for used herein include activated carbon, amorphous carbon, graphite and carbon nanotubes although they are not limited thereto. The layer having a peroxide-decomposing catalyst may further include an electrolyte. Examples of the electrolyte for used herein include the sulfonated engineering plastics, as well as poly(perfluoroalkylsulfonic acid)s.

The polymer materials for use in the polymer electrolyte fuel cell according to the present invention may have number-average molecular weights of from 10000 to 250000 g/mol, preferably from 20000 to 220000 g/mol, and more preferably from 25000 to 200000 g/mol as number-average molecular weights in terms of polystyrene measured by gel permeation chromatography (GPC). If the polymer materials have number-average molecular weights of less than 10000 g/mol, they may cause the electrolyte membrane to have insufficient strength if the polymer materials have number-average molecular weights of more than 250000 g/mol, they may cause the fuel cell to show insufficient output performance. Thus they are both undesirable.

Polymer materials for use in the polymer electrolyte fuel cell are used in the form of polymer membranes (polymer films). Exemplary techniques for the preparation of polymer membranes include solution casting in which a membrane is formed from a material in the form of a solution; melt pressing; and melt extrusion. Among them, solution casting is preferred, in which a polymer solution is applied onto a substrate through casting, followed by removal of a solvent to form a membrane.

The solvent for use in the membrane formation process is not limited, as long as one capable of removing after dissolution of the polymer material therein. Examples of such solvents include aprotic polar solvents, alkylene glycol monoalkyl ethers, alcohols and tetrahydrofuran. Exemplary aprotic polar solvents include N,N-dimethylformamide, N,N-dimethylacetamide, N-methyl-2-pyrrolidone, and dimethyl sulfoxide. Exemplary alkylene glycol monoalkyl ethers include ethylene glycol monomethyl ether, ethylene glycol monoethyl ether, propylene glycol monomethyl ether and propylene glycol monoethyl ether. Exemplary alcohols include iso-propyl alcohol and t-butyl alcohol.

The production of a polymer electrolyte membrane for use in the polymer electrolyte fuel cell according to the present invention may employ additives for regular polymers within ranges not adversely affecting the objects of the present invention. Examples of such additives include plasticizers, antioxidants, peroxide-decomposing catalysts, metal scavengers, surfactants, stabilizers and release agents.

Exemplary antioxidants include amine antioxidants, phenolic antioxidants, sulfur-containing antioxidants and phosphorus-containing antioxidants. Exemplary amine antioxidants include phenol-α-naphthylamine, phenol-β-naphthylamine, diphenylamine, p-hydroxydiphenylamine and phenothiazine. Exemplary phenolic antioxidants include 2,6-di(t-butyl)-p-cresol, 2,6-di(t-butyl)-p-phenol, 2,4-dimethyl-6-(t-butyl)-phenol, p-hydroxyphenylcyclohexane, di-p-hydroxyphenylcyclohexane, styrenated phenol and 1,1'-methylenebis(4-hydroxy-3,5-t-butylphenol). Exemplary sulfur-containing antioxidants include dodecylmercaptan, dilaurylthiodipropionate, distearyl thiodipropionate, dilauryl sulfide, and mercaptobenzimidazole. Exemplary phosphorus-containing antioxidants include trinonylphenyl phosphite, trioctadecyl phosphite, tridecyl phosphite and trilauryl trithiophosphite.

The peroxide-decomposing catalysts are not limited, as long as having a catalytic activity of decomposing a peroxide. Examples thereof include metals, metal oxides, metal phosphates, metal fluorides and macrocyclic metal complexes in addition to the antioxidants. Each of these may be used alone or in combination. Among them, preferred metals include Ru and Ag; preferred metal oxides include $RuO$, $WO_3$, $CeO_2$ and $Fe_3O_4$; preferred metal phosphates include $CePO_4$, $CrPO_4$, $AlPO_4$ and $FePO_4$; preferred metal fluorides include $CeF_3$ and $FeF_3$; and preferred macrocyclic metal complexes include Fe-porphyrin, Co-porphyrin, heme and catalase. Above all, $RuO_2$ or $CePO_4$ is preferably used for high peroxide-decomposition activity.

The metal scavengers are not limited, as long as reacting with a metal ion such as $Fe^{2+}$ or $Cu^{2+}$ to form a complex to thereby inactivate the metal ion and to suppress the deterioration-promoting activity of the metal ion. Examples of such metal scavengers usable herein include thenoyltrifluoroacetone, sodium diethyldithiocarbamate (DDTC), 1,5-diphenyl-3-thiocarbazone, crown ethers (e.g., 1,4,7,10,13-pentaoxycyclopentadecane and 1,4,7,10,13,16-hexaoxycyclopentadecane), cryptands (e.g., 4,7,13,16-tetraoxa-1,10-diazacyclooctadecane and 4,7,13,16,21,24-hexaoxy-1,10-diazacyclohexacosane), and porphyrin materials (e.g. tetraphenylporphyrin).

The amounts of these materials in the production of the polymer electrolyte membrane is not limited to those disclosed in the embodiments of the present invention. Among them, a mixture of a phenolic antioxidant and a phosphorus-containing antioxidant is preferable because the mixture is effective even in a small amount and little adversely affects the characteristics of the fuel cell. The antioxidant, peroxide-decomposing catalyst and metal scavenger may be added to the electrolyte membrane and electrode, or may be disposed between the electrolyte membrane and electrode. In particular, such materials are preferably added to the cathode or disposed between the cathode and the electrolyte membrane because they can exhibit the respective effects even in small amounts and little adversely affect the characteristics of the fuel cell.

Though not critical, the thickness of the polymer electrolyte membrane according to the present invention is preferably from 10 to 300 μm, and more preferably from 15 to 200 μm. In order to ensure the strength of the membrane sufficient for the practical use, the thickness is preferably 10 μm or more. In order to reduce the resistance of the membrane, that is, to improve an electric generation performance, the thickness is preferably 300 μm or less.

In the solution casting, the thickness of the polymer electrolyte membrane can be controlled by the concentration of the solution or the thickness of the applied material solution to a substrate. In forming the membrane from a molten state, the thickness can be controlled by drawing a film at a predetermined draw ratio, the film having been obtained in a predetermined thickness by melt pressing or melt extrusion.

The electrode catalyst layer is prepared by bonding the polymer electrolyte membrane according to the present invention and a catalyst-carrying carbon powder using a proton-conductive polymer electrolyte. The polymer electrolyte may employ a customary fluorochemical polymer electrolyte or a hydrocarbon electrolyte. Examples of such hydrocarbon electrolytes include sulfonated engineering plastic electrolytes, sulfoalkylated engineering plastic electrolytes, hydrocarbon electrolytes, and the hydrocarbon polymers into which a proton-conductivity-imparting group and an oxidation-resistance-imparting group have been introduced. Exemplary sulfonated engineering plastic electrolytes include sulfonated poly(ether ether ketone)s, sulfonated poly (ether sulfone)s, sulfonated poly(acrylonitrile-butadiene-styrene)s, sulfonated polysulfides, and sulfonated polyphenylenes. Exemplary sulfoalkylated engineering plastic electrolytes include sulfoalkylated poly(ether ether ketone)s, sulfoalkylated poly(ether sulfone)s, sulfoalkylated poly (ether ether sulfone)s, sulfoalkylated polysulfones, sulfoalkylated polysulfides, sulfoalkylated polyphenylenes and sulfoalkylated poly(ether ether sulfone)s. Exemplary hydrocarbon electrolytes include sulfoalkyl-etherified polyphenylenes.

An anode catalyst and a cathode catalyst for use in the anode and the cathode may be any metals which promote an oxidation reaction of the fuel and a reductive reaction of oxygen. Examples of such catalysts include platinum, gold, silver, palladium, iridium, rhodium, ruthenium, iron, cobalt, nickel, chromium, tungsten, manganese, vanadium, titanium and alloys of them. Among these metals, platinum (Pt) is often used. The metal serving as a catalyst has a particle size of generally from 1 to 30 nm. Such a catalyst is preferably supported by a carrier such as carbon because this reduces the amount of the catalyst to be used, thus advantageous in cost. The amount of the supported catalyst is preferably 0.01 to 20 $mg/cm^2$ after the formation of an electrode.

Electrodes for use in the membrane electrode assembly (polymer electrolyte membrane electrode assembly, MEA) are each composed of a conductive material carrying microparticles of a catalyst metal thereon and may include a water repellant and/or a binder according to necessity. In another embodiment, a layer composed of a conductive material carrying no catalyst; and a water repellant and/or a binder contained according to necessity is arranged outside the catalyst layer. The conductive material on which the catalyst metal is to be carried is not limited, as long as being an electron-conductive material, and examples thereof include metals and carbon materials. Exemplary carbon materials include carbon blacks such as furnace black, channel black and acetylene black; fibrous carbons such as carbon nanotubes; activated carbon; and graphite. Each of these may be used alone or in combination.

A fluorinated carbon may be used as the water repellant, for example.

The binder is preferably a solution of hydrocarbon electrolyte of the same type as the electrolyte membrane from the viewpoint of bonding. However, various other resins may be used. A fluorocarbon resin having water repellency such as a polytetrafluoroethylene, a tetrafluoroethylene-perfluoroalkyl vinyl ether copolymer or a tetrafluoroethylene-hexafluoropropylene copolymer may be added.

The way to bond the polymer electrolyte membrane to the electrode in the production of the fuel cell is not limited and may employ a known method. An exemplary method for producing a membrane electrode assembly includes mixing a conductive material (e.g., a carbon) carrying a Pt catalyst powder with a polytetrafluoroethylene suspension; applying the mixture to a carbon paper; applying a heat treatment to the carbon paper to form a catalyst layer; thereafter applying a solution including a polymer electrolyte which is the same material as that of the polymer electrolyte membrane as a solute or a solution of a fluorocarbon electrolyte as the binder to a catalyst layer; and integrating the catalyst layer with the polymer electrolyte membrane by a hot press. Other methods for producing the membrane electrode assembly include a method for previously applying a solution of a polymer electrolyte, which is the same as that of the polymer electrolyte membrane, to a Pt catalyst powder; a method for applying a catalyst paste to the polymer electrolyte membrane by printing, spraying or ink-jet process; an electroless plating method for plating the electrode on the polymer electrolyte membrane through electroless plating; and a method for allowing the polymer electrolyte membrane to adsorb platinum-group metal complex ions, followed by reduction thereof. Among them, the method for applying the catalyst paste to the polymer electrolyte membrane by the ink-jet process is superior with little loss of the catalyst.

Typically, a single cell of a direct methanol fuel cell including a polymer electrolyte membrane electrode assembly; gas diffusion sheets; and conductive separators can be formed, in which the polymer electrolyte membrane serving as an electrolyte membrane is interposed between an oxygen electrode formed on one principal surface of the electrolyte membrane and a methanol electrode formed on the other principal surface thereof, the gas diffusion sheets are respectively stuck on the oxygen and methanol electrode sides of the electrolyte membrane electrode assembly, and the conductive separators have gas- and liquid-supply flow paths to the oxygen electrode and methanol electrode, respectively, and are provided on outer surfaces of the gas diffusion sheets.

The present invention will be illustrated in further detail with reference to several working examples below. It should be noted, however, that these examples are never construed to limit the scope of the present invention.

Example 1

(1) Production of Polymer Electrolyte Membrane

Figure 1A:
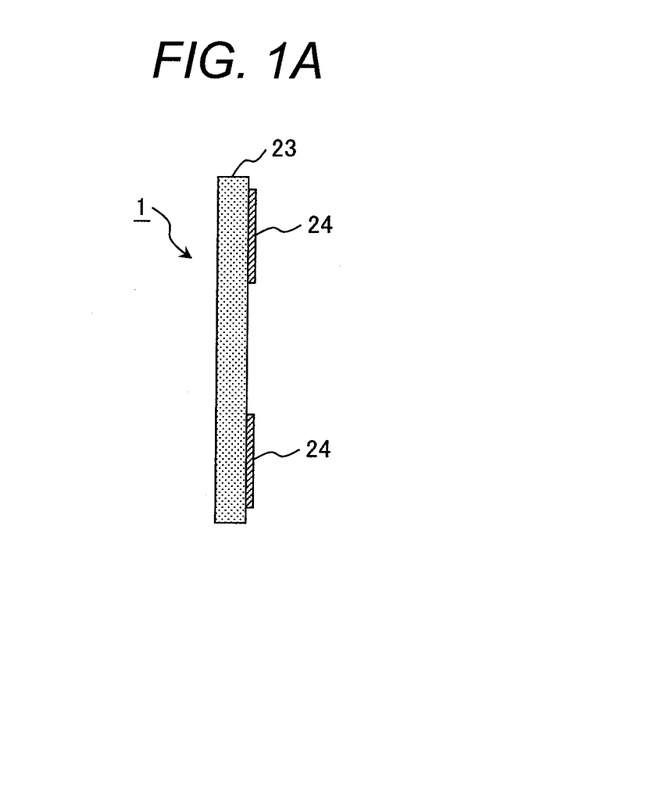
FIG. 1A is a cross-sectional view illustrating a polymer electrolyte membrane according to a working example.
Figure 1B:
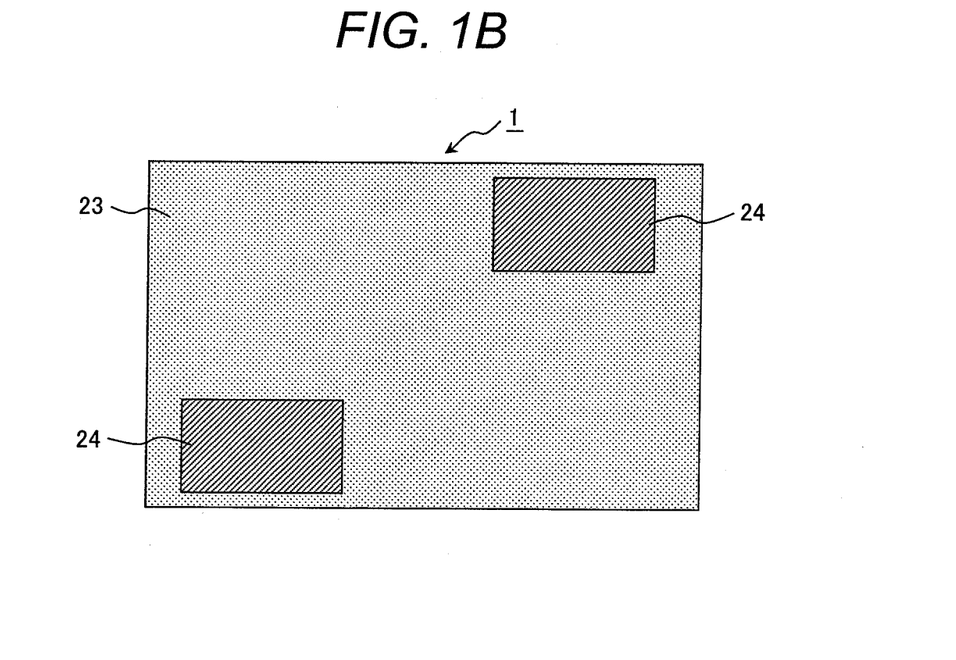
FIG. 1B is a front view illustrating the polymer electrolyte membrane according to the working example.

A polymer electrolyte membrane 1 illustrated in FIGS. 1A and 1B was produced. FIGS. 1A and 1B are a cross-sectional view and a front view of the polymer electrolyte membrane, respectively.

With reference to FIGS. 1A and 1B, the polymer electrolyte membrane 1 includes a first membrane 23 (formed from an electrolyte A) serving as a substrate; and two plies of a second membrane 24 (formed from an electrolyte B) arranged on part of a surface of the first membrane 23.

The electrolyte A was a sulfomethylated poly(ether sulfone) having an ion-exchange capacity of 1.3 meq/g and a number-average molecular weight (Mn) of $8 \times 10^4$ g/mol, which had been prepared by the procedure described in Example 14 of Japanese Unexamined Patent Application Publication No. 2002-110174. The electrolyte A was dissolved to a concentration of 15 percent by weight in N-methyl-2-pyrrolidone (NMP) and thereby yielded a solution of electrolyte A.

The electrolyte B was a sulfomethylated poly(ether sulfone) having an ion-exchange capacity of 1.0 meq/g and a number-average molecular weight (Mn) of $8 \times 10^4$ g/mol, which had been prepared by the same procedure as the electrolyte A. The electrolyte B was dissolved to a concentration of 15 percent by weight in N-methyl-2-pyrrolidone (NMP) and thereby yielded a solution of electrolyte B.

The solution of electrolyte A was cast to form a membrane (electrolyte membrane A), thereafter the solution of electrolyte B was cast onto a surface of the electrolyte membrane A only in a first region corresponding to the vicinity of a cathode-side oxidative gas inlet and in a second region corresponding to the vicinity of a cathode-side oxidative gas outlet (see FIG. 1B), the resulting work was dried by heating, immersed in sulfuric acid and water, further dried, and thereby yielded a polymer electrolyte membrane 1 having a thickness of 40 μm.

In this example, two plies of the second membrane 24 (formed from the electrolyte B) were disposed in the vicinities of opposed corners of the first membrane 23 (formed from the electrolyte A).

Measuring conditions for the gel permeation chromatography (GPC) used in the measurement of number-average molecular weight are as follows.

GPC apparatus: HLC-8220GPC supplied by Tosoh Corporation

Column: Two pieces of TSK-gel SuperAWM-H supplied by Tosoh Corporation

Eluent: N-Methyl-2-pyrrolidone (NMP, added with 10 mmol/L lithium bromide)

(2) Production of Membrane Electrode Assembly (MEA)

Figure 1C:
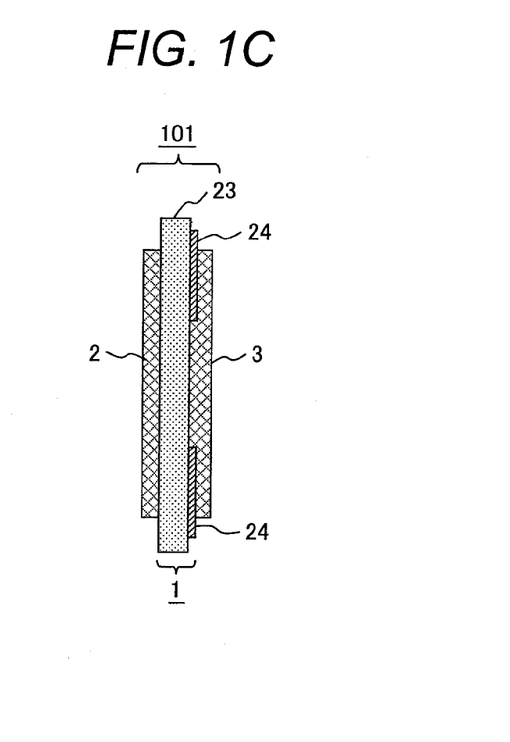
FIG. 1C is a cross-sectional view illustrating a membrane electrode assembly (MEA) using the polymer electrolyte membrane of FIG. 1A.
Figure 1D:
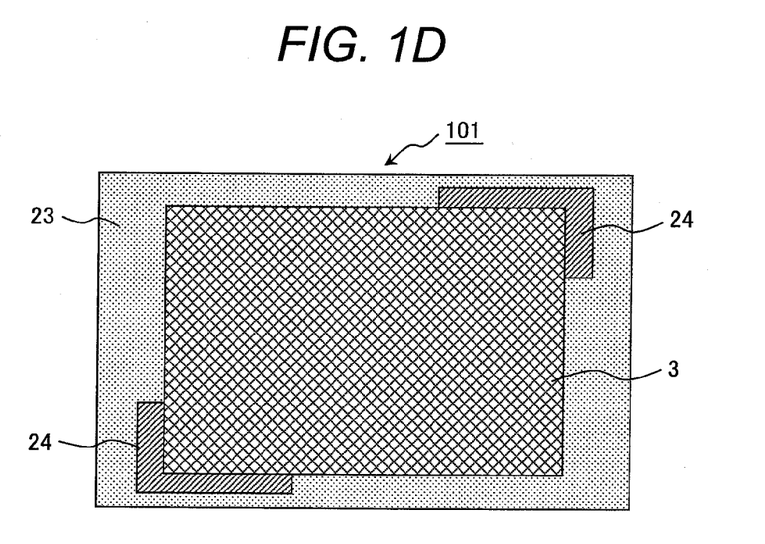
FIG. 1D is a front view illustrating the membrane electrode assembly (MEA) using the polymer electrolyte membrane of FIG. 1A.

A membrane electrode assembly 101 (MEA) illustrated in FIGS. 1C and 1D was produced. FIGS. 1C and 1D are a cross-sectional view and a front view, respectively, of the membrane electrode assembly 101.

With reference to FIGS. 1C and 1D, the membrane electrode assembly 101 includes an anode 2 and a cathode 3, and a polymer electrolyte membrane 1 being held therebetween.

The anode 2 was prepared in the following manner.

A slurry was prepared by mixing a catalyst power and 5 percent by weight of a poly (perfluorosulfonic acid) in a solvent mixture of 1-propanol, 2-propanol and water, the catalyst powder including a carbon carrier dispersing and carrying thereon 80 percent by weight of microparticles as a 1:1.5 mixture of platinum and ruthenium. The slurry was applied by spraying to a catalyst weight of 2 g/cm$^2$ to one side of the polymer electrolyte membrane 1 and thereby yielded thereon the anode 2 having a thickness of about 20 μm, a width of 200 mm and a length of 150 mm.

The cathode 3 was prepared in the following manner.

A slurry was prepared by mixing a catalyst powder and 5 percent by weight of a poly(perfluorosulfonic acid) with a solvent mixture of 1-propanol, 2-propanol and water, the catalyst powder including a carbon carrier and dispersing and carrying thereon 70 percent by weight of platinum microparticles. The slurry was applied by spraying to a catalyst weight of 2 g/cm$^2$ to the other side of the polymer electrolyte membrane 1 opposite to the anode 2 and thereby yielded the cathode 3 having a thickness of about 20 μm, a width of 200 mm and a length of 150 mm.

Next, hot pressing was performed at 120° C. and 13 MPa and thereby yielded the membrane electrode assembly 101.

Figure 1E:
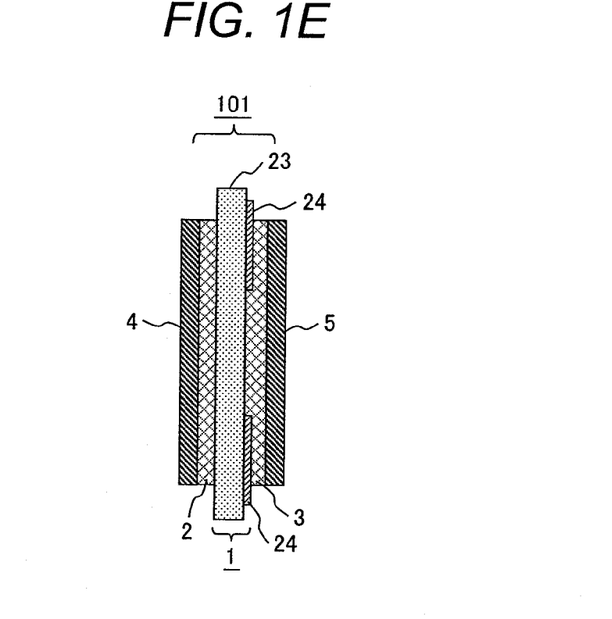
FIG. 1E is a cross-sectional view illustrating the MEA of FIG. 1C and gas diffusion layers.
Figure 1F:
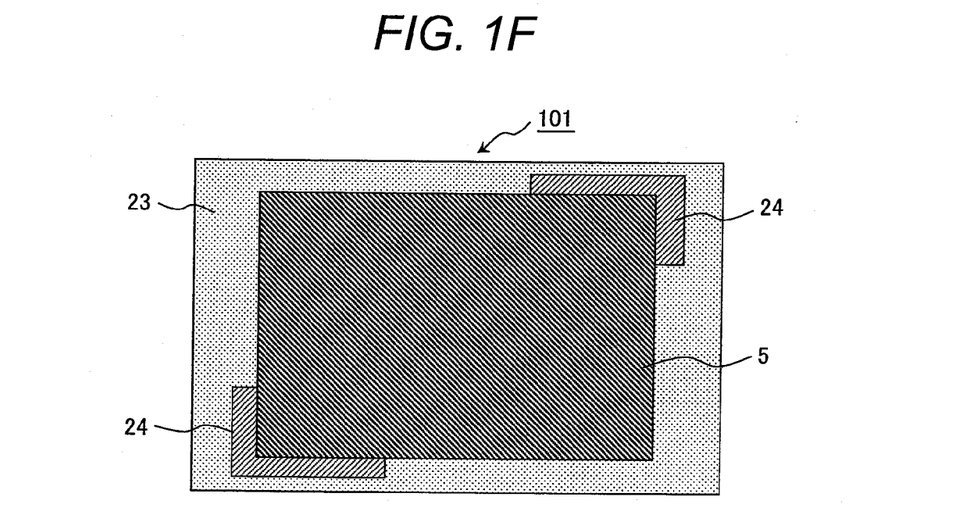
FIG. 1F is a front view illustrating the MEA of FIG. 1C and the gas diffusion layers.

(3) Production of Direct Methanol Fuel Cell (DMFC) and Power Generation Performance Thereof FIGS. 1E and 1F are schematic diagrams illustrating a structure including an anode diffusion layer and a cathode diffusion layer each serving as a gas diffusion layer; and the produced MEA being held between the gas diffusion layers. FIGS. 1E and 1F are a cross-sectional view and a front view of the structure, respectively.

The membrane electrode assembly 101 (MEA) herein is the same as the membrane electrode assembly 101 illustrated in FIGS. 1C and 1D.

An anode diffusion layer 4 was arranged outside the anode 2 so as to be in intimate contact with the anode 2. Likewise, a cathode diffusion layer 5 was arranged outside the cathode 3 so as to be in intimate contact with the cathode 3. FIG. 1F is a view when seen from the side where the cathode diffusion layer 5 is arranged.

With reference to FIGS. 1E and 1F, the anode diffusion layer 4 and the cathode diffusion layer 5 were arranged so as to cover the entire surfaces of the anode 2 and the cathode 3, respectively. In addition, with reference to FIG. 1F, the anode diffusion layer 4 and the cathode diffusion layer 5 were arranged so as to be within (not to be protruded from) the plane of the polymer electrolyte membrane 1.

An anode-side separator was provided outside the anode diffusion layer 4, a cathode-side separator was provided outside the cathode diffusion layer 5, and the separators were allowed to be in intimate contact with the anode diffusion layer 4 and the cathode diffusion layer 5, respectively, and thereby yielded a polymer electrolyte fuel cell (direct methanol fuel cell).

Figure 2:
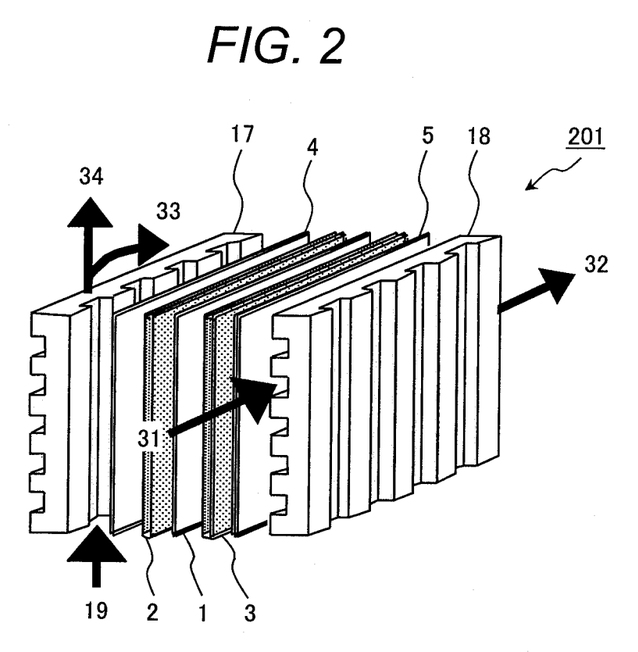
FIG. 2 is an exploded perspective view illustrating a polymer electrolyte fuel cell according to the working example.

FIG. 2 is an exploded perspective view illustrating the internal structure of the polymer electrolyte fuel cell.

With reference to FIG. 2, the polymer electrolyte fuel cell includes a polymer electrolyte membrane 1 (solid polymer electrolyte membrane), an anode 2, a cathode 3, an anode diffusion layer 4, a cathode diffusion layer 5, an anode-side separator 17 and a cathode-side separator 18. These constituents are assembled by sticking each other to form a single cell 201 of the direct methanol fuel cell.

3 percent by weight methanol aqueous solution 19 is allowed to flow through a fuel flow path of the anode-side separator 17; and air 31 (oxidative gas) is allowed to flow through an air flow path of the cathode-side separator 18. The methanol aqueous solution 19 is oxidized while passing through the fuel flow path to give protons (H$^+$), and the protons diffuse inside the polymer electrolyte membrane 1 and react with oxygen contained in the air 31 passing through the air flow path to form water 33. The water 33 and an exhaust gas 34 containing reaction products and unreacted residues (methanol aqueous solution, carbon dioxide and water vapor) form a mixture and are discharged out of the single cell 201. The air 31 is converted into an air 32 containing water vapor and is discharged out of the single cell 201.

The compact single cell 201 illustrated in FIG. 2 was subjected to a power generation test to measure the power generation performance of the direct methanol fuel cell using the above MEA.

In this measurement, the single cell 201 was placed in a thermostatic bath, and the temperature of the thermostatic bath was controlled so that the temperature of the thermocouples (not shown) disposed in the anode-side separator 17 and the cathode-side separator 18 be 60° C.

The cathode 3 was humidified using a humidifier disposed outside the single cell 201. The temperature of the humidifier was controlled to be in a range of 37° C. to 43° C. so that the dew point in the vicinity of an outlet of the humidifier be 40° C. Electricity was generated at a density of load current of 150 mA/cm$^2$, a methanol utilization of 10%, and an air utilization of 6%. As a result, it has been found that the single cell 201 outputs a voltage of 0.4 V or more and can stably generate electricity for 2500 hours or longer.

(4) Molecular Weight Measurement of Electrolyte Membrane During Power Generation of Direct Methanol Fuel Cell (DMFC)

The continuous test shown in Section (3) in this example was performed further two times, and specimens were cut out from the electrolyte membrane in a first region corresponding to the vicinity of the cathode-side oxidative gas inlet and in a second region corresponding to the vicinity of the cathode-side oxidative gas inlet at 500 hours and 1000 hours in the continuous tests, and the molecular weights of the cut specimens were measured.

As a result, it has been found that the first region have number-average molecular weights (Mn) of $8 \times 10^4$ g/mol and $7 \times 10^4$ g/mol at 500 hours and 1000 hours in the continuous test, respectively; and the second region have number-average molecular weights (Mn) of $8 \times 10^4$ g/mol and $8 \times 10^4$ g/mol at 500 hours and 1000 hours into the continuous test, respectively.

Example 2

(1) Production of Polymer Electrolyte Membrane

Figure 3A:
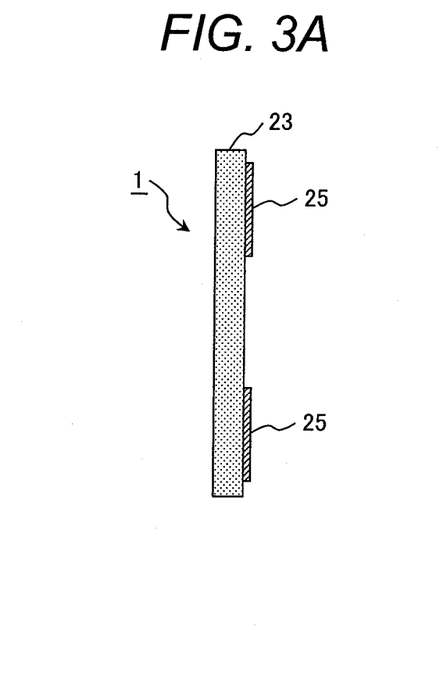
FIG. 3A is a cross-sectional view illustrating a polymer electrolyte membrane according to another working example.
Figure 3B:
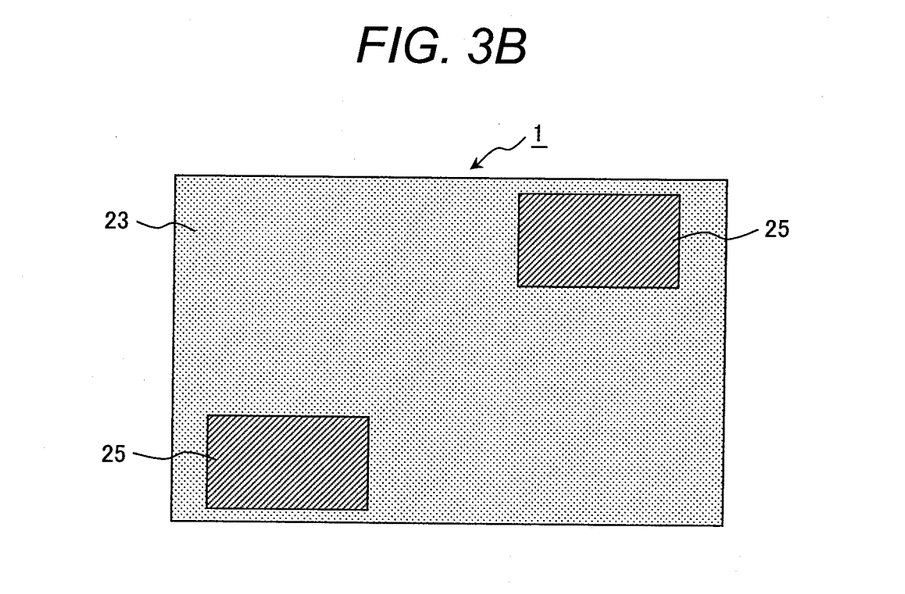
FIG. 3B is a front view illustrating the polymer electrolyte membrane of FIG. 3A.

A polymer electrolyte membrane illustrated in FIGS. 3A and 3B was produced. FIGS. 3A and 3B are a cross-sectional view and a front view of the polymer electrolyte membrane, respectively.

With reference to FIGS. 3A and 3B, the polymer electrolyte membrane 1 includes a first membrane 23 (formed from the electrolyte A) serving as a substrate; and two plies of a second membrane 25 (formed from an electrolyte C) arranged on part of one surface of the first membrane 23.

The electrolyte C was a sulfomethylated poly(ether sulfone) having an ion-exchange capacity of 1.3 meq/g and a number-average molecular weight (Mn) of $10 \times 10^4$ g/mol which had been prepared by the procedure described in Example 14 of Japanese Unexamined Patent Application Publication No. 2002-110174. The electrolyte C was dissolved to a concentration of 15 percent by weight in N-methyl-2-pyrrolidone (NMP) and thereby yielded a solution of electrolyte C.

The solution of electrolyte A as with Example 1 was cast to form a membrane (electrolyte membrane A), thereafter the solution of electrolyte C was cast onto a surface of the electrolyte membrane A only in a first region corresponding to the vicinity of a cathode-side oxidative gas inlet and in a second region corresponding to the vicinity of a cathode-side oxidative gas outlet (see FIG. 3B), the resulting work was dried by heating, immersed in sulfuric acid and water, further dried, and thereby yielded a polymer electrolyte membrane 1 having a thickness of 40 μm.

In this example, two plies of the second membrane 25 (formed from the electrolyte C) were disposed in the vicinities of opposed corners of the first membrane 23 (formed from the electrolyte A).

(2) Production of Membrane Electrode Assembly (MEA)

Figure 3C:
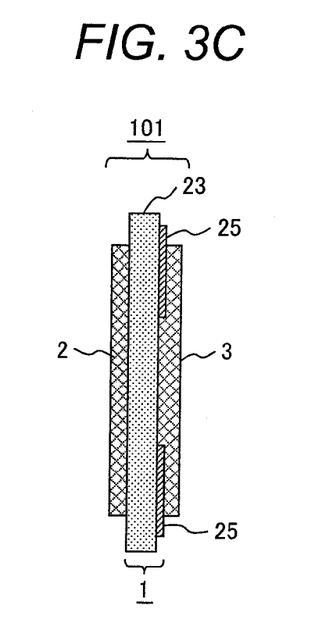
FIG. 3C is a cross-sectional view illustrating a MEA using the polymer electrolyte membrane of FIG. 3A.
Figure 3D:
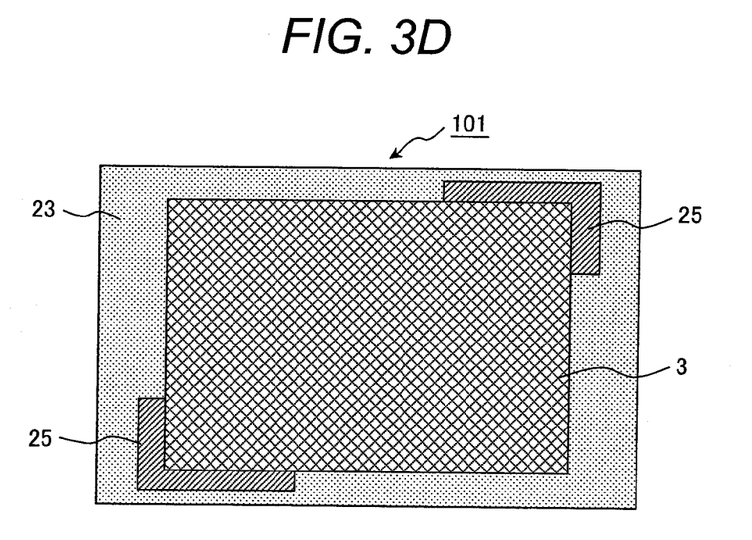
FIG. 3D is a front view illustrating the MEA using the polymer electrolyte membrane of FIG. 3A.

A membrane electrode assembly 101 (MEA) was produced by the procedure of Section (2) of Example 1. The membrane electrode assembly 101 is illustrated in FIGS. 3C and 3D.

(3) Production of Direct Methanol Fuel Cell (DMFC) and Power Generation Performance Thereof A direct methanol fuel cell (single cell) was produced using the above-prepared MEA, and the power generation performance thereof was measured by the procedure of Section (3) of Example 1. As a result, it has been found that the single cell outputs a voltage of 0.4 V or more and can stably generate electricity for 2000 hours or longer.

(4) Molecular Weight Measurement of Electrolyte Membrane During Power Generation of Direct Methanol Fuel Cell (DMFC)

The direct methanol fuel cell was subjected to a continuous test by the procedure of Section (4) of Example 1, specimens were cut from the electrolyte membrane in a first region corresponding to the vicinity of the cathode-side oxidative gas inlet and in a second region corresponding to the vicinity of the cathode-side oxidative gas inlet at 500 hours and 1000 hours in the continuous test, and the molecular weights of the cut specimens were measured.

As a result, it has been found that the first region have number-average molecular weights (Mn) of $8 \times 10^4$ g/mol and $6 \times 10^4$ g/mol at 500 hours and 1000 hours in the continuous test, respectively; and the second region have number-average molecular weights (Mn) of $10 \times 10^4$ g/mol and $9 \times 10^4$ g/mol at 500 hours and 1000 hours in the continuous test, respectively.

By setting the second membrane 25 to have a molecular weight larger than that of the first membrane 23 as in this example, the deterioration of the electrolyte membrane can be suppressed, because the molecular weight reduction of the electrolyte is retarded with an increasing molecular weight thereof.

Comparative Example (1) Production of Polymer Electrolyte Membrane

Figure 4A:
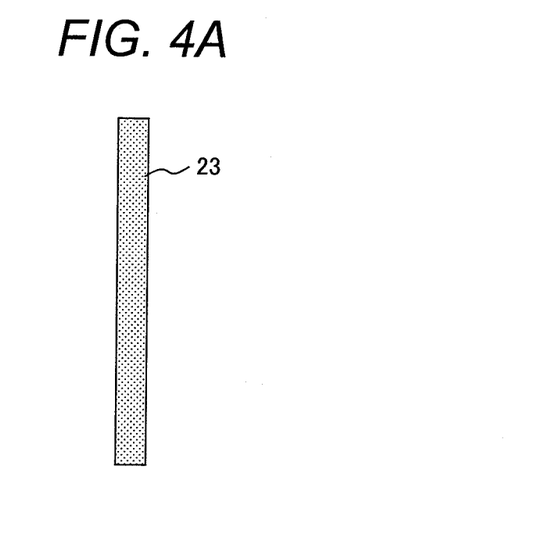
FIG. 4A is a cross-sectional view illustrating a polymer electrolyte membrane according to a comparative example.
Figure 4B:
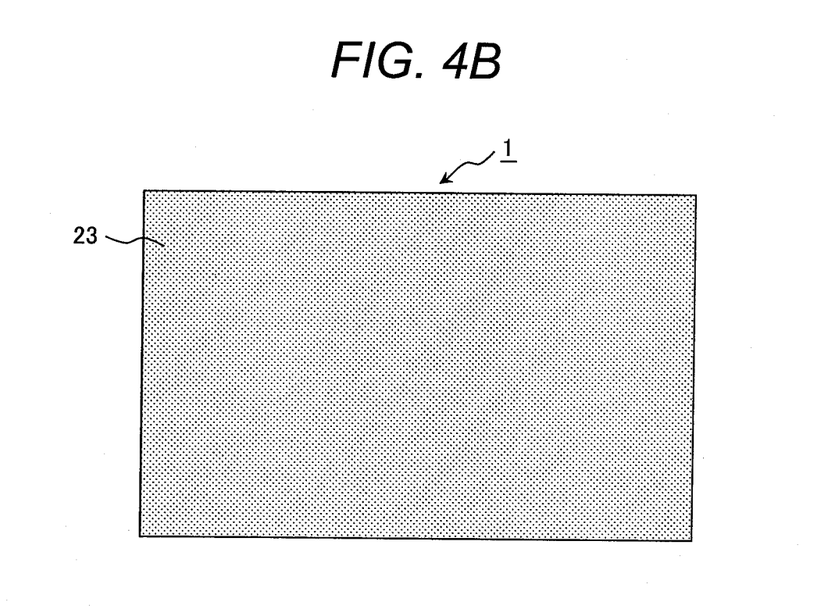
FIG. 4B is a front view illustrating the polymer electrolyte membrane according to the comparative example.

A polymer electrolyte membrane illustrated in FIGS. 4A and 4B was produced. FIGS. 4A and 4B are a cross-sectional view and a front view of the polymer electrolyte membrane, respectively.

Specifically, the electrolyte A as with Example 1 was cast to form a membrane, dried by heating, immersed in sulfuric acid and water, further dried, and thereby yielded a polymer electrolyte membrane 1 having a thickness of 40 μm.

(2) Production of Membrane Electrode Assembly (MEA)

Figure 4C:
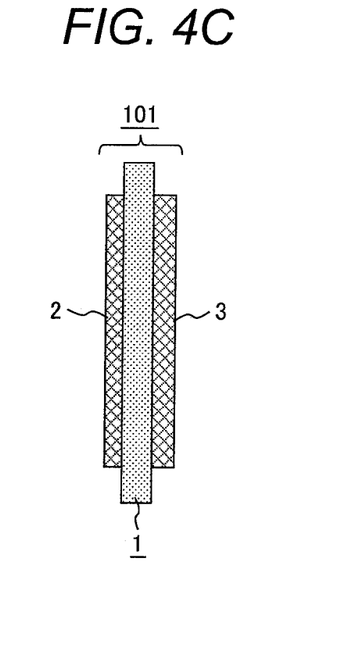
FIG. 4C is a cross-sectional view illustrating a MEA using the polymer electrolyte membrane of FIG. 4A.
Figure 4D:
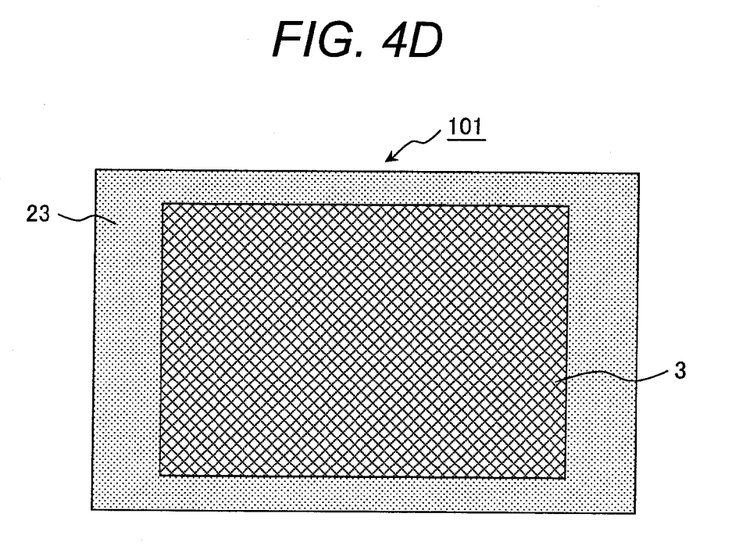
FIG. 4D is a front view illustrating the MEA using the polymer electrolyte membrane of FIG. 4A.

A membrane electrode assembly 101 (MEA) was produced by the procedure of Section (2) of Example 1. The membrane electrode assembly 101 is illustrated in FIGS. 4C and 4D.

(3) Production of Direct Methanol Fuel Cell (DMFC) and Power Generation Performance Thereof A direct methanol fuel cell (single cell) was produced using the above-prepared MEA, and the power generation performance thereof was measured by the procedure of Section (3) of Example 1. As a result, it has been found that the single cell outputs a voltage of 0.4 V or more but becomes incapable of generating electricity 1500 hours into the continuous test due to the deterioration of the membrane.

(4) Molecular Weight Measurement of Electrolyte Membrane During Power Generation of Direct Methanol Fuel Cell (DMFC)

The direct methanol fuel cell was subjected to a continuous test by the procedure of Section (4) of Example 1, specimens were cut from the electrolyte membrane in a first region corresponding to the vicinity of the cathode-side oxidative gas inlet and in a second region corresponding to the vicinity of the cathode-side oxidative gas inlet at 500 hours and 1000 hours in the continuous test, and the molecular weights of the cut specimens were measured.

As a result, it has been found that the first region have number-average molecular weights (Mn) of $5\times10^4$ g/mol and $3\times10^4$ g/mol at 500 hours and 1000 hours in the continuous test, respectively; and the second region have number-average molecular weights (Mn) of $7\times10^4$ g/mol and $5\times10^4$ g/mol at 500 hours and 1000 hours in the continuous test, respectively.

The results demonstrate that the polymer electrolyte fuel cells according to Examples 1 and 2 and Comparative Example output a voltage of 0.4 V or more and have high output properties satisfying practical conditions of fuel cells. The results also demonstrate that the polymer electrolyte fuel cells according to Examples 1 and 2 have lives longer than that of the polymer electrolyte fuel cell according to Comparative Example. In addition, it has also been found that the polymer electrolyte fuel cells according to Examples 1 and 2 have molecular weights of the electrolyte membrane during power generation larger than that of the polymer electrolyte fuel cell according to Comparative Example, indicating that they are more resistant to deterioration.

Thus, it has been found that the direct methanol fuel cells according to the present invention show high outputs and have more satisfactory durability than that of the direct methanol fuel cell according to Comparative Example.

In addition, it has been found that polymer electrolyte membranes for use in the polymer electrolyte fuel cells according to the present invention are produced by using polymer materials having satisfactory mechanical properties and good oxidation resistance, and thereby the polymer electrolyte membranes and the membrane electrode assemblies (MEAs) also have long lives.

Polymer electrolyte membranes according to embodiments of the present invention are usable typically in direct methanol fuel cells and polymer electrolyte fuel cells.

What is claimed is:

1. A polymer electrolyte membrane for use in a membrane electrode assembly including an anode, a cathode and the polymer electrolyte membrane, the polymer electrolyte membrane comprising
    a first membrane and a second membrane being two different membranes composed of polymer electrolytes having different ion-exchange capacities from each other,
    wherein the first membrane has an area of one surface thereof equal to or larger than an area of one surface of the anode or cathode, and
    wherein the second membrane has an area of one surface thereof smaller than that of the first membrane, is arranged in a gas inflow region on a side being in contact with the cathode, and has an ion-exchange capacity smaller than that of the first membrane.

2. A polymer electrolyte membrane for use in a membrane electrode assembly including an anode, a cathode and the polymer electrolyte membrane, the polymer electrolyte membrane comprising:
    a first membrane and a second membrane being two different membranes composed of polymer electrolytes having different ion-exchange capacities from each other,
    wherein the first membrane has an area of one surface thereof equal to or larger than an area of one surface of an anode or a cathode, and
    wherein the second membrane has an area of one surface thereof smaller than that of the first membrane, is arranged in a gas inflow region on a side being in contact with the cathode, and has a number-average molecular weight larger than that of the first membrane.

3. The polymer electrolyte membrane according to claim 1, wherein the second membrane contains a peroxide-decomposing catalyst.

4. The polymer electrolyte membrane according to claim 1, further comprising another ply of the second membrane arranged in a gas outflow region on a side being in contact with the cathode.

5. The polymer electrolyte membrane according to claim 4, the one surface of the first membrane is rectangular, and the two plies of the second membrane are arranged on opposite corners of the one surface being rectangular.

6. The polymer electrolyte membrane according to claim 1, wherein the polymer electrolytes are aromatic hydrocarbon electrolytes.

7. The polymer electrolyte membrane according to claim 1, wherein the polymer electrolytes have ion-exchange capacities of 0.3 to 5.0 meq/g.

8. The polymer electrolyte membrane according to claim 1, wherein the polymer electrolytes have number-average molecular weights of 10000 to 250000 g/mol in terms of polystyrene as measured by gel permeation chromatography (GPC).

9. A membrane electrode assembly comprising an anode; a cathode; and the polymer electrolyte membrane of claim 1,
    wherein the polymer electrolyte membrane is interposed between the anode and the cathode.

10. A membrane electrode assembly according to claim 9, wherein at least the cathode being in contact with the second membrane contains a peroxide-decomposing catalyst.

11. A polymer electrolyte fuel cell comprising the membrane electrode assembly of claim 9.

* * * * *